United States Patent
Konecny et al.

(10) Patent No.: US 7,624,246 B2
(45) Date of Patent: Nov. 24, 2009

(54) METHOD AND SYSTEM FOR MEMORY ALLOCATION IN A MULTIPROCESSING ENVIRONMENT

(75) Inventors: Petr Konecny, Seattle, WA (US); Simon H. Kahan, Seattle, WA (US)

(73) Assignee: Cray Inc., Seattle, WA (US)

( * ) Notice: Subject to any disclaimer, the term of this patent is extended or adjusted under 35 U.S.C. 154(b) by 469 days.

(21) Appl. No.: 11/584,173

(22) Filed: Oct. 20, 2006

(65) Prior Publication Data

US 2007/0100916 A1 May 3, 2007

Related U.S. Application Data

(60) Provisional application No. 60/728,533, filed on Oct. 20, 2005.

(51) Int. Cl.
  *G06F 12/00* (2006.01)
  *G06F 13/00* (2006.01)
  *G06F 13/28* (2006.01)
  *G06F 9/46* (2006.01)

(52) U.S. Cl. ............... 711/170; 711/171; 718/104

(58) Field of Classification Search ............... None
See application file for complete search history.

(56) References Cited

U.S. PATENT DOCUMENTS 5,446,855 A * 8/1995 Dang et al. ............... 711/1
5,864,867 A * 1/1999 Krusche et al. ............... 707/104.1
6,353,829 B1 3/2002 Koblenz et al.
6,539,464 B1 * 3/2003 Getov ............... 711/170
2003/0097537 A1 * 5/2003 Bollella et al. ............... 711/170
2003/0187888 A1 * 10/2003 Hayward ............... 707/206

OTHER PUBLICATIONS

Berger et al., "Hoard: A Scalable Memory Allocator for Multithreaded Applications," ACM SIGPLAN Notices, vol. 35, Issue 11, Nov. 2000, pp. 117-128, ACM Press, N.Y.

* cited by examiner

*Primary Examiner*—Christian P Chace
*Assistant Examiner*—Gary W Cygiel
(74) *Attorney, Agent, or Firm*—Perkins Coie LLP

(57) ABSTRACT

A method and system for allocating and de-allocating memory for threads of an application is provided. An allocation system provides a heap for tracking free tokens of memory that are available for allocation to threads of an application. A heap tracks collections of free tokens of the fixed token size. The allocation system receives memory requests from threads that specify an allocation type of allocate or de-allocate. When multiple memory requests are pending concurrently from multiple threads, then the allocation system attempts to combine memory requests of the same type and of the same token size that are received from different threads. One of the threads is responsible for updating the heap to effect the two memory requests. The allocation system combines multiple memory requests so that the heap need only be accessed once to allocate or de-allocate multiple tokens.

22 Claims, 15 Drawing Sheets

METHOD AND SYSTEM FOR MEMORY ALLOCATION IN A MULTIPROCESSING ENVIRONMENT

CROSS REFERENCE TO RELATED APPLICATION

This application claims the benefit of U.S. Provisional Application No. 60/728,533, filed on Oct. 20, 2005, and entitled "MAMA!" A MEMORY ALLOCATOR FOR MULTITHREADED ARCHITECURES," which is incorporated by reference herein.

BACKGROUND

Parallel computer architectures generally provide multiple processors that can each execute different tasks simultaneously. One such parallel computer architecture is referred to as a multithreaded architecture (MTA). The MTA supports not only multiple processors but also multiple streams executing simultaneously in each processor. The processors of an MTA computer are interconnected via an interconnection network. Each processor can communicate with every other processor through the interconnection network. FIG. 1 provides a high-level overview of an MTA computer. Each processor 101 is connected to the interconnection network and memory 102. Each processor contains a complete set of registers 101a for each stream. In addition, each processor also supports multiple protection domains 101b so that multiple user programs can execute simultaneously within that processor.

Each MTA processor can execute multiple threads of execution simultaneously. Each thread of execution executes on one of the 128 streams supported by an MTA processor. Every clock time period, the processor selects a stream that is ready to execute and allows it to issue its next instruction. Instruction interpretation is pipelined by the processor, the network, and the memory. Thus, a new instruction from a different stream may be issued in each time period without interfering with other instructions that are in the pipeline. When an instruction finishes, the stream to which it belongs becomes ready to execute the next instruction. Each instruction may contain up to three operations (i.e., a memory reference operation, an arithmetic operation, and a control operation) that are executed simultaneously.

The state of a stream includes one 64-bit Stream Status Word ("SSW"), 32 64-bit General Registers ("R0-R31"), and eight 32-bit Target Registers ("T0-T7"). Each MTA processor has 128 sets of SSWs, of general registers, and of target registers. Thus, the state of each stream is immediately accessible by the processor without the need to reload registers when an instruction of a stream is to be executed.

Each MTA processor supports as many as 16 active protection domains that define the program memory, data memory, and number of streams allocated to the computations using that processor. Each executing stream is assigned to a protection domain, but which domain (or which processor, for that matter) is assigned need not be known by the user program.

The MTA divides memory into program memory, which contains the instructions that form the program, and data memory, which contains the data of the program. The MTA uses a program mapping system and a data mapping system to map addresses used by the program to physical addresses in memory. The mapping systems use a program page map and a data segment map. The entries of the data segment map and program page map specify the location of the segment in physical memory along with the level of privilege needed to access the segment.

Each memory location in an MTA computer has four access state bits in addition to a 64-bit value. These access state bits allow the hardware to implement several useful modifications to the usual semantics of memory reference. These access state bits are two data trap bits, one full/empty bit, and one forward bit. The two data trap bits allow for application-specific lightweight traps, the forward bit implements invisible indirect addressing, and the full/empty bit is used for lightweight synchronization. The behavior of these access state bits can be overridden by a corresponding set of bits in the pointer value used to access the memory. The two data trap bits in the access state are independent of each other and are available for use, for example, by a language implementer. If a trap bit is set in a memory location, then an exception will be raised whenever that location is accessed if the trap bit is not disabled in the pointer. If the corresponding trap bit in the pointer is not disabled, then a trap will occur.

The forward bit implements a kind of "invisible indirection." Unlike normal indirection, forwarding is controlled by both the pointer and the location pointed to. If the forward bit is set in the memory location and forwarding is not disabled in the pointer, the value found in the location is interpreted as a pointer to the target of the memory reference rather than the target itself. Dereferencing continues until either the pointer found in the memory location disables forwarding or the addressed location has its forward bit cleared.

The full/empty bit supports synchronization behavior of memory references. The synchronization behavior can be controlled by the full/empty control bits of a pointer or of a load or store operation. The four values for the full/empty control bits are shown below.

| VALUE | MODE | LOAD | STORE |
| --- | --- | --- | --- |
| 0 | normal | read regardless | write regardless and set full |
| 1 | | Reserved | reserved |
| 2 | future | wait for full and leave full | wait for full and leave full |
| 3 | sync | wait for full and set empty | wait for empty and set full |

When the access control mode (i.e., synchronization mode) is future, loads and stores wait for the full/empty bit of memory location to be accessed to be set to full before the memory location can be accessed. When the access control mode is sync, loads are treated as "consume" operations and stores are treated as "produce" operations. A load waits for the full/empty bit to be set to full and then sets the full/empty bit to empty as it reads, and a store waits for the full/empty bit to be set to empty and then sets the full/empty bit to full as it writes. A forwarded location (i.e., its forward bit is set) that is not disabled (i.e., by the access control of a pointer) and that is empty (i.e., the full/empty bit is set to empty) is treated as "unavailable" until its full/empty bit is set to full, irrespective of access control.

The full/empty bit may be used to implement arbitrary indivisible memory operations. The MTA also provides a single operation that supports extremely brief mutual exclusion during "integer add to memory." The FETCH_ADD operation loads the value from a memory location and stores the sum of that value and another value back into the memory location.

Conventional computer systems provide memory allocation techniques that allow programs or applications to allocate and de-allocate (i.e., free) memory dynamically. To allocate a block of memory, a program invokes a memory allocation routine (e.g., "malloc") passing the size of the requested block of memory. The memory allocation routine locates a free block of memory, which is usually stored in a "heap," marks the block as being allocated, and returns to the program a pointer to the allocated block of memory. The program can then use the pointer to store data in the block of memory. When the program no longer needs that block of memory, the program invokes a memory free routine (e.g., "free") passing a pointer to the block of memory. The memory free routine marks the block as free so that it can be allocated to a subsequent request.

A program executing on a single-threaded processor may have multiple threads that execute concurrently, but not simultaneously. Each of these threads may request that memory be allocated or freed. Conventional memory allocation techniques, however, do not support the concurrent execution of memory allocation or memory free routines. If such routines were executed concurrently, a thread may find the state of the data structures used when allocating and freeing memory to be inconsistent because another thread is in the process of updating the state. Conventional memory allocation techniques may use a conventional locking mechanism (e.g., a semaphore) to prevent the concurrent execution of the memory allocation and memory free routines. Thus, the locked-out threads will wait until another thread completes its memory allocation. Such waiting may be acceptable in a single-threaded processor environment because only one thread can be executing at any one time, so the processor may be always kept busy. Such waiting, however, is unacceptable in a multithreaded processor environment because many streams of the processor may be left idle waiting for a thread executing on another stream to complete its memory allocation request.

FIG. 2 is a block diagram that illustrates the layout of a word of memory and in particular a pointer stored in a word of memory. Each word of memory contains a 64-bit value and a 4-bit access state. The 4-bit access state is described above. When the 64-bit value is used to point to a location in memory, it is referred to a "pointer." The lower 48 bits of the pointer contains the address of the memory location to be accessed, and the upper 16 bits of the pointer contain access control bits. The access control bits indicate how to process the access state bits of the addressed memory location. One forward disable bit indicates whether forwarding is disabled, two full/empty control bits indicate the synchronization mode; and four trap 0 and 1 disable bits indicate whether traps are disabled for stores and loads, separately. If the forward disable bit is set, then no forwarding occurs regardless of the setting of the forward enable bit in the access state of the addressed memory location. If the trap 1 store disable bit is set, then a trap will not occur on a store operation, regardless of the setting of the trap 1 enable bit of the access state of the addressed memory location. The trap 1 load disable, trap 0 store disable, and trap 0 load disable bits operate in an analogous manner. Certain operations include a 5-bit access control operation field that supersedes the access control field of a pointer. The 5-bit access control field of an operation includes a forward disable bit, two full/empty control bits, a trap 1 disable bit, and a trap 0 disable bit. The bits effect the same behavior as described for the access control pointer field, except that each trap disable bit disables or enables traps on any access and does not distinguish load operations from store operations.

Conventional memory allocation routines are typically optimized to allocate memory based on the expected allocation patterns of the programs. For example, if it is expected that the programs will allocate many small blocks of memory, the memory allocation routines are optimized to allocate small blocks of memory efficiently. If, however, a program requests that a large block of memory be allocated, it may be very inefficient to service the request because, for example, it may be necessary to coalesce many free small blocks of memory into a single block of memory large enough to satisfy the request. Conversely, a conventional memory allocation routine may be optimized to allocate large blocks of memory efficiently. In such a case, it may be very efficient to allocate large blocks of memory but inefficient either computationally or in memory usage to allocate many small blocks.

Memory allocation from a shared and unpartitioned global address space to support parallel applications is a fundamental need of shared-memory parallel computers. In the absence of faster processors, one way to increase application performance is by increasing concurrency. As a result of increased concurrency, future applications will likely have an ever-increasing number of threads allocating memory concurrently. Even where applications themselves do not perform a great deal of dynamic memory allocation, the mechanisms supporting parallelization such as stack allocation and thread creation do perform such memory allocation.

Hoard is an allocator that attempts to attain scalable and memory-efficient allocator performance as described in Berger, E., McKinley, K., Blumofe, R., and Wilson, P., "Hoard: A Scalable Memory Allocator for Multithreaded Applications," Proceedings of ASPLOS '00, 2000. Unfortunately, Hoard cannot be scaled up without impractical expenditure of space. Hoard instantiates a number (e.g., two) of "local" allocators per processor. In addition, Hoard instantiates a global pool managed by a global allocator. There is an affinity of allocators to processors in that each processor first tries to allocate from one of its local allocators; if that allocator is empty, it tries to refill from the global allocator; if that fails, it allocates a new block from the operating system.

According to Hoard, each heap is specific to a range of request sizes, which implies internal fragmentation at a rate proportional to the ratio of successive ranges. This internal fragmentation seems to be acceptable in practice. Requests larger than half of an implementation specific block-size are directed to the operating system. Each heap manages its list of blocks, never touching blocks belonging to other heaps. However, when its blocks are sparsely utilized, heaps move an unused or nearly unused block into the global pool. Once a block in the global pool is completely unused, it becomes available to all heaps.

A lock-free approach is described in Michael, M., "Scalable Lock-Free Dynamic Memory Allocation," Proceedings of the ACM SIGPLAN 2004 Conference on Programming Language Design and Implementation, Washington, D.C., Jun. 9-11, 2004, that is similar to Hoard in that it also uses repeated heaps of super blocks in proportion to the required concurrency backed by a global pool implemented as a shared FIFO of super blocks. Again, larger requests are directed to the operating system. Its lock-free approach, however, provides robustness against deadlock should threads fail to progress.

Memory allocation for the MTA was initially implemented in a similar spirit to Hoard; that is, concurrency is by virtue of repeated data structures using various forms of locking to ensure atomicity. This implementation, however, may suffer contention under allocation surges, suggesting that it would not scale with system size.

These parallel memory allocators rely on heap repetition to support concurrency. When individual heaps are exhausted, they can be refilled from the next level in a small hierarchy. In some instances, the first level is the heap itself, the second is a global pool or FIFO, and the third is the OS.

DETAILED DESCRIPTION

Figure 1:
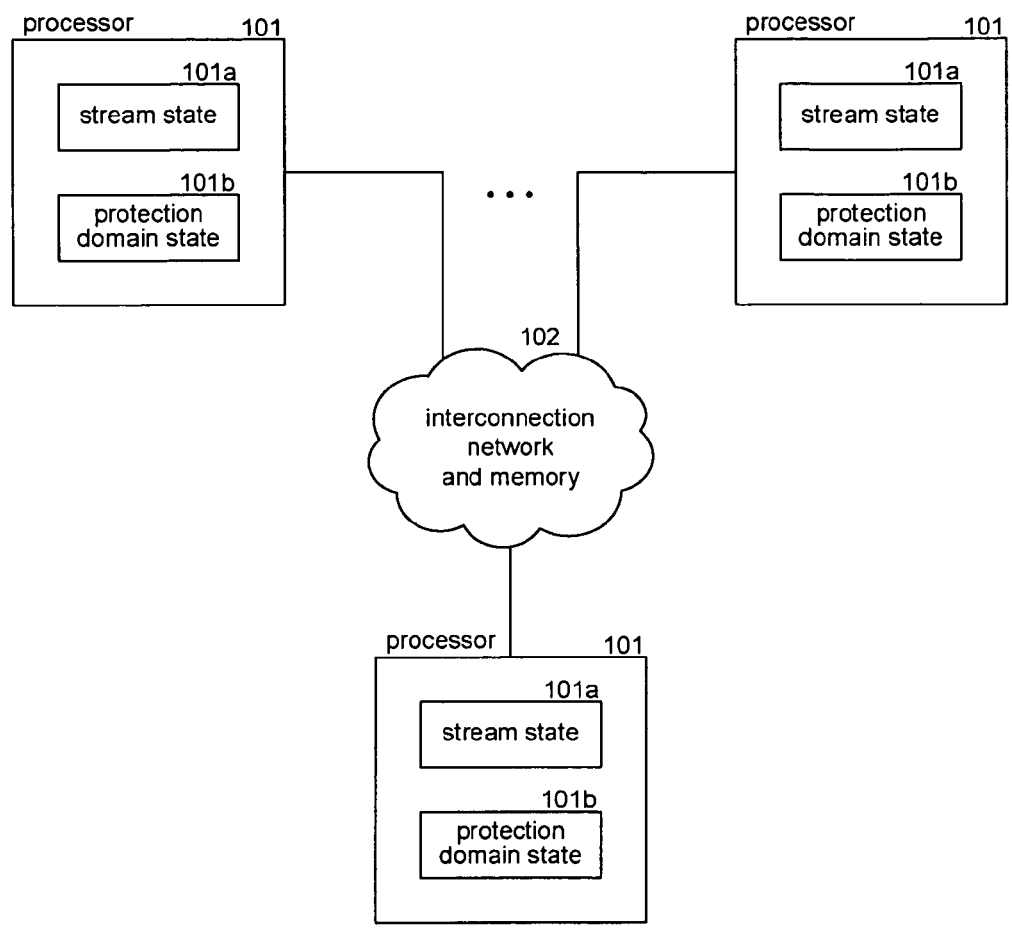
FIG. 1 provides a high-level overview of an MTA computer.
Figure 2:
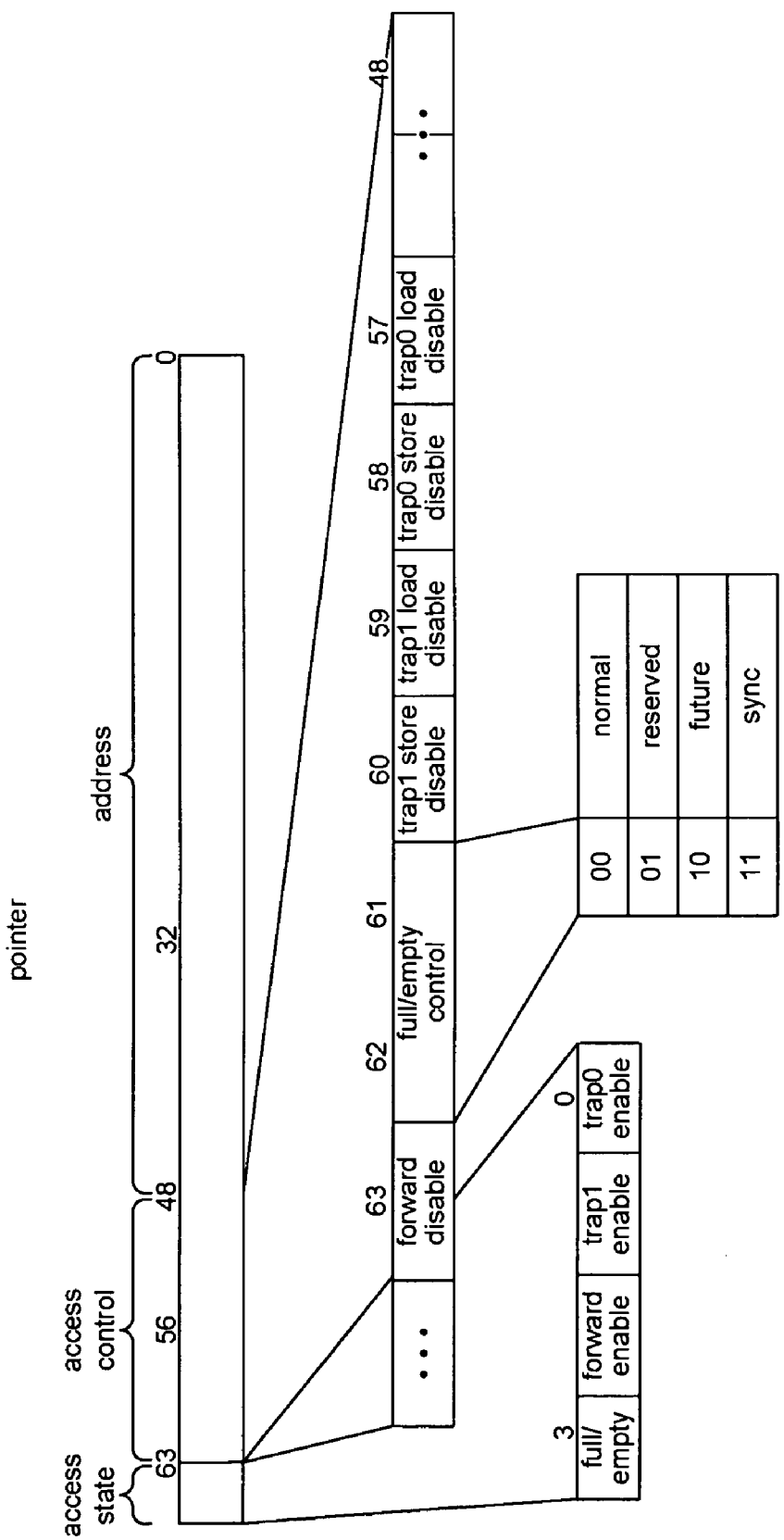
FIG. 2 is a block diagram that illustrates the layout of a word of memory and in particular a pointer stored in a word of memory.

A method and system for allocating and de-allocating memory for threads of an application is provided. In one embodiment, an allocation system provides a heap for tracking free tokens of memory that are available for allocation to threads of an application. A token is a contiguous area of memory that can be assigned to a thread of an application. A heap tracks tokens of a fixed token size. For example, a heap may track tokens of size 128. The allocation system may include multiple heaps for tracking tokens that are of different sizes. For example, the allocation system may implement 5 heaps with token sizes 4, 8, 16, 128, and 512. The number of heaps implemented by an allocation system and their token sizes can vary depending on the requirements of the application. A heap tracks collections of free tokens of the fixed token size. For example, if a heap originally has a collection of 256 tokens and 32 tokens have been allocated to a thread, then the heap may have a collection of 128 free tokens, a collection of 64 free tokens, and a collection of 32 free tokens. If the thread de-allocates the 32 tokens, the allocation system may combine the collections of free tokens and the 32 de-allocated tokens into a collection of 256 free tokens. The allocation system receives memory requests from threads that specify an allocation type of allocate or de-allocate. When multiple memory requests are pending concurrently from multiple threads, then the allocation system attempts to combine memory requests of the same type and of the same token size that are received from different threads. For example, if the allocation system receives two requests to de-allocate a token of token size 16, the allocation system combines or merges the requests. The allocation system combines the requests by updating the request of one of the threads, referred to as the responsible or parent thread, to identify that two tokens of size 16 are to be de-allocated. The allocation system then releases the other thread so that it can continue processing. The responsible thread is responsible for updating the heap to effect the de-allocation of the two tokens. After updating the heap, the responsible thread is then released to continue processing. As another example, if the allocation system receives two requests to allocate a token of size 16, the allocation system combines the memory allocate requests into a single request by updating the memory request of the responsible thread. The responsible thread is responsible for updating the heap to effect the allocation of the two tokens. The responsible thread provides one of the allocated tokens to the other thread and both threads are then released to continue processing. In this way, the allocation system combines multiple memory requests so that the heap (which may use a semaphore to synchronize access) need only be accessed once to allocate or de-allocate multiple tokens.

In one embodiment, the allocation system executing within a thread that has issued a memory request starts by looking for concurrent memory requests (owned by other threads) for the same heap. A concurrent memory request is one that has been issued by another thread, has not yet been completed, and is for the same token size. If the thread finds a concurrent memory request, the thread, which becomes the responsible thread, combines the memory requests. The responsible thread becomes responsible for handling both memory requests. The behavior of the other thread depends on the type of the request. If the request is to allocate, the other thread waits for the result from the responsible thread. If the request is to de-allocate, the other thread returns to the routine that issued the memory request, so that the other thread can continue its processing. The responsible thread can repeatedly combine concurrent memory requests until an aggregate memory request of some arbitrary size s>0 is built. One of the threads that issued one of the memory requests of the aggregate memory request is the only responsible thread. The responsible thread attempts to lock the heap to complete the request, while the other s−1 threads either wait or return. If the responsible thread is unable to lock the heap, it attempts to continue combining memory requests with its aggregate memory request. The responsible thread may remain responsible for handling the aggregate memory request, or another thread may become the responsible thread. If the responsible thread is able to lock the heap, it removes or inserts a collection of tokens into the heap and then unlocks the heap. If the memory request was to allocate, the other threads, which are waiting, are provided their tokens and are released to continue their processing. Once a waiting thread receives a collection of tokens from its responsible thread, it splits the collection into a token and the remaining tokens of the collection and provides a collection of the remaining tokens to the other threads for which it is responsible. When a thread receives a single token, the allocation system returns that token to the application, which can continue its processing. If the memory request was to de-allocate, the responsible thread is released to continue its processing. The other threads were already released. If the responsible thread is again unable to lock the heap, it continues attempting to combine additional memory requests.

In one embodiment, the allocation system may combine an allocation request with a de-allocate request or a collection of allocate requests with a collection of de-allocate requests. The allocation system combines the memory requests of different types by providing a token to be de-allocated to a thread requesting the allocation of a token. The thread that is responsible for handling allocate memory requests is provided a collection of tokens that are being de-allocated and distributes the tokens to the other threads whose allocation requests were combined. In this way, the allocation system can satisfy memory requests without ever accessing the heap.

Figure 3:
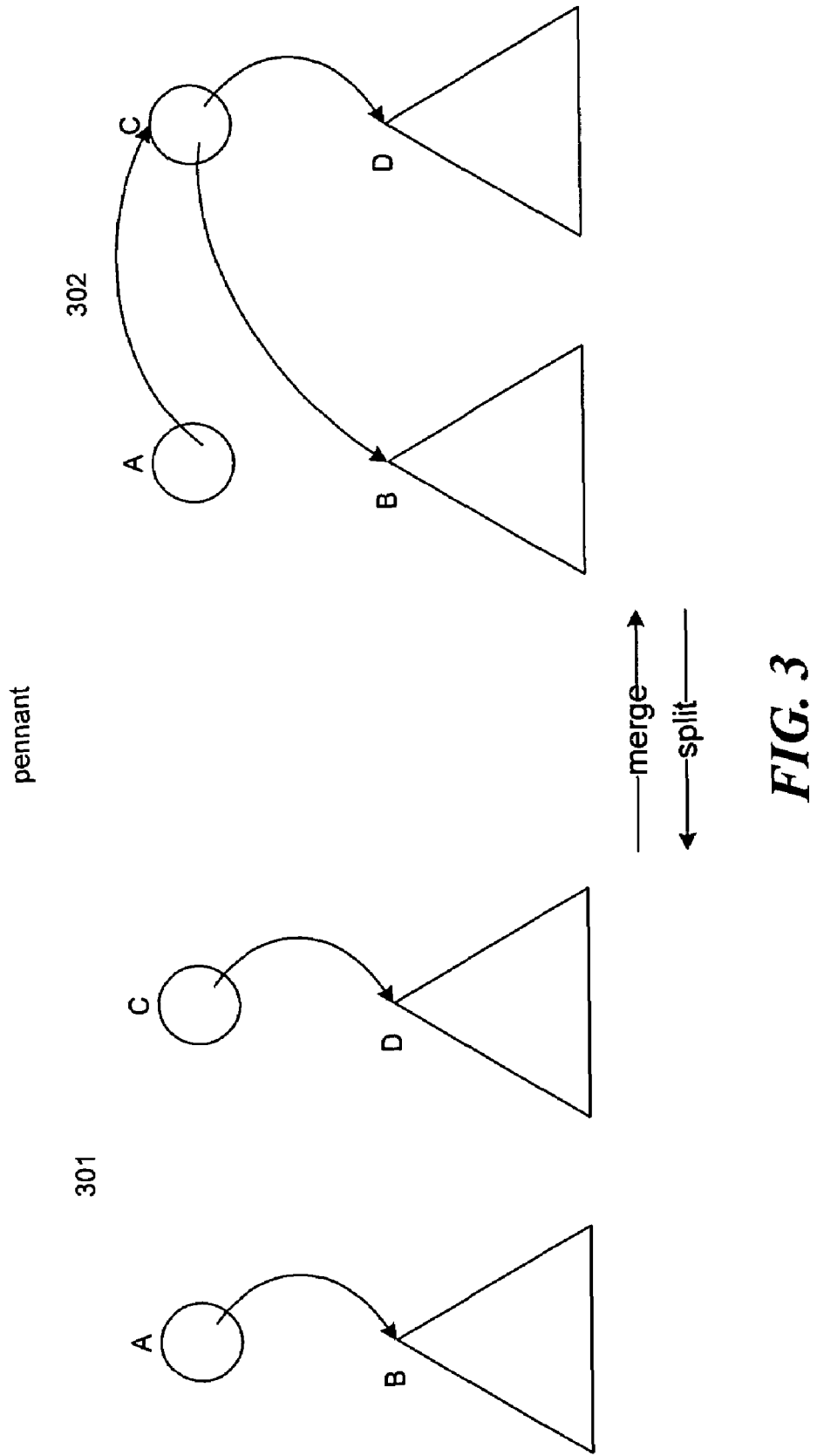
FIG. 3 is a block diagram that illustrates the splitting and merging of pennant data structures.

In one embodiment, the allocation system uses a pennant data structure, rather than a linked list, to track the free tokens of a heap. A pennant data structure is a special form of a binary tree. The allocation system can efficiently insert and remove such binary trees from a heap. A pennant of rank 0 is a single node. A pennant of rank r>0 has a top node of the pennant data structure that points to a single child node that is the root node of a complete binary tree of height r−1. A pennant of rank r has $2^r$ nodes. The allocation system implements the pennant data structure by storing two pointers (L and R) in each node. The allocation system merges two pennants of rank r into a pennant of rank r+1 by setting the top node of a first pennant to point to the top node of the second pennant and the previous top node of the second pennant to point to the child node of the first pennant. The previous top node of the second pennant will thus point to its original child node and the previous child node of the top node of the first pennant to form a complete binary tree. The allocation system splits a pennant of rank r+1 into two pennants of rank r using the reverse process. FIG. 3 is a block diagram that illustrates the splitting and merging of pennant data structures. Illustration 301 shows two pennants. The left pennant has top node A with child node B, and the right pennant has top node C with child node D. Illustration 302 shows the pennant resulting from the merger of the two pennants. Top node A is the top node of the merged pennants, and previous top node C is the root node of the complete binary tree of the merged pennant. The allocation system uses pennants to represent collections of tokens and aggregate memory requests.

The allocation system stores a collection of tokens of the same token size in a heap using a pennant data structure. A heap of size K supports insertion and removal of pennants of tokens of rank r, where 0<=r<K. A heap includes an array of K pointers p[0:K]. If the integer portion of $n/2^r$ is odd where n is the number of tokens in the heap, then p[r] points to a pennant of rank r. Otherwise, p[r] is nil. The allocation system may select K to accommodate the total memory available to the application. A heap also contains a funnel data structure with layers (described below) and a lock to implement synchronized access to the heap. The allocation system inserts a pennant P of tokens of rank r into a heap as follows. If p[r] is nil, the allocation system sets p[r] to point to pennant P and completes. Otherwise, the allocation system merges pennant P with the pennant p[r] and then attempts to insert the merged pennant, which has a rank of r+1, at p[r+1]. This process of merging and attempting insertion continues until a pointer of the array corresponding to the rank of the merged pennant is nil. The allocation system remove a pennant of rank r from the heap by first finding the smallest s>=r such that p[s] is not nil. If there is no such pennant in the heap, the allocation system allocates a new block of memory from the operating system. When the allocation system finds a p[s] that is not nil, it sets p[s] to nil. If the pennant P previously pointed to by p[s] has the number of tokens represented by the combined memory request, the allocation system returns the tokens of pennant P and completes. Otherwise, the allocation system splits pennant P and stores a pointer to one of the split pennants in p[s−1]. The allocation system continues splitting and storing pennants until the pennant with the requested number of tokens is reached.

As described above, if the heap does not contain any pennant of rank s>=r, the allocation system requests memory from the operating system. The allocation system requests a contiguous block of memory large enough to hold 2r tokens. The allocation system could upon receiving the block convert it to a complete pennant data structure by setting the pointers in each token or node of the pennant. Because the number of tokens may be large, the thread performing the conversion may be delayed an unacceptably long time. To avoid this delay, the allocation system defers the converting of the newly allocated block to a complete pennant by distributing the conversion process over subsequent memory requests. The allocation system allows the complete binary trees of a pennant to be represented implicitly as contiguous blocks of $2^l-1$ un-initialized tokens, for l<=r. For example, in FIG. 3 the complete binary trees with the root nodes of B and D could actually correspond to contiguous blocks of tokens. Since tokens are word aligned, the lowest bit of its address is zero. The allocation system can distinguish an un-initialized complete binary tree from an initialized binary tree by setting the lowest bit of the pointer in the top node to 1 when it points to an un-initialized binary tree. For pennants of tokens, the allocation system checks during a split whether the child node of the top node has been initialized. If so, the allocation system uses pointer arithmetic to update A.R and initialize the returned token.

The allocation system combines memory requests A and B of two different threads to reduce the contention for heap access. The allocation system finds a pair of requests using an atomic operation, such as the fetch-and-add operation of the MTA. The allocation system, executing under control of a thread, increments a shared counter to get a unique index for the memory request of the thread. The allocation system uses the index to define a parent/child relationship between memory requests and the parent's thread becomes responsible for finding and handling the child memory requests by combining the memory requests. After finding its child memory request (described below) and combining them, the responsible thread reads the counter again to see if its parent memory request has arrived (i.e., the counter advanced past the parent's index). If the parent memory request has not arrived, the responsible thread tries to lock the heap so that it can effect the memory request. If the responsible thread cannot lock the heap, it is because another thread is accessing the heap and the thread continues attempting to combine memory requests. The allocation system identifies memory requests for combining using a funnel data structure.

In one embodiment, the allocation system represents a memory request with four fields: free, rank, R, and L. In the case of a de-allocate request, free is a pointer that points to a token (or pennant of tokens) to be de-allocated. In the case of an allocate request, free is nil. Rank contains the rank of the pennant pointed to by free or the rank of combined allocate requests. R and L are pointers that implement a pennant of memory requests. A memory request may also contain a synchronization field, result, for waking waiting threads and storing a pointer to the allocated token. In one embodiment, the waiting is represented by a wait function that waits for another thread to call either the function success or the function failure on the memory request. The function wait returns true, if the thread was woken using the function success, or false if it was woken using the function failure.

The allocation system uses a funnel data structure to find pairs of memory requests to combine. The funnel data structure consists of F layers indexed by the rank of the memory request to be merged. The layer r matches requests of rank r to combine them into requests of rank r+1. Each layer contains a counter and an array ("comm") of pointers to memory requests. The allocation system initializes the counter to zero. The allocation system uses a fetch-and-increment operation to assign a sequence of integers to memory requests combining in a layer. The allocation system identifies child memory requests of a parent memory request using a binomial tree model. A binomial tree $B_k$ is an ordered tree whose root has k children where the i-th child is a binomial tree of order k-i. $B_k$ has 2k nodes and all of its sub-trees are also binomial trees $B_i$ for some i<=k. The allocation system uses a left-to-right postorder numbering starting from zero to assign integers to nodes of $B_k$. The allocation system does not explicitly store these binomial trees; it uses them only to define parent-child relationships between memory requests. The height of a node n is equal to the number of consecutive 1s from the right of its binary representation and also to the number of its children. To compute the parent of a node n, the allocation system changes the lowest order zero bit in its binary representation to one.

When a memory request is received, the allocation system attempts to combine each memory request with its children in right-to-left order and then attempts to combine with its parent if it combined with all its children. Since the numbering is postorder, the children memory requests always arrive before their parent and a child can check if its parent has arrived by reading the number of requests that have arrived at the funnel layer. If the parent does not arrive in time, the thread tries to lock the heap to perform its operation. However, the thread leaves a message (in an array of the funnel layer) that it cannot wait to merge, should the parent arrive in the future.

In one embodiment, the allocation system represents this combining as follows. The thread that wants to combine its memory request increments the counter of an appropriate layer and gets the previous value a of the counter. The thread then reads pointers to requests stored in the comm array of the funnel, indexed by a's children in decreasing order, and combines with them. If it successfully combines with all its children, it has a request of rank r>=0. The thread then checks the counter again and determines whether its parent has arrived. It also stores the address of its request into comm[a] for the parent to pick up and waits for the result. There are three cases where memory requests cannot combine with parents:

1. one or more children cannot merge (i.e., comm[child]= nil);
2. the memory request was annihilated with one of its children; and
3. its parent has not arrived yet.

In all of these cases, the allocation system sets comm[a] to nil after sending failure to all of the remaining waiting children. The function returns a status of true, if the thread still owns its request, and of false, if it was combined into another request.

To allocate a token, the allocation system repeatedly attempts to combine memory requests in the appropriate layers of the funnel. If an attempt fails, it means that the request was already completed by another thread, which filled the result field of the memory request. If an attempt succeeds, the thread attempts to lock the heap to remove tokens from it. If it encounters contention, the thread continues combining. Once the thread removes a collection of tokens, it repeatedly splits the collections and sends parts to children of the aggregate memory, which wakes up the corresponding threads. To de-allocate a token, a thread attempts to combine its memory request with other memory requests. The thread attempts to insert the tokens in the heap by first attempting to lock the heap. If the attempt at locking is successful, the thread effects the de-allocation. Otherwise, the thread attempts to combine its memory request with other memory requests.

Figure 4:
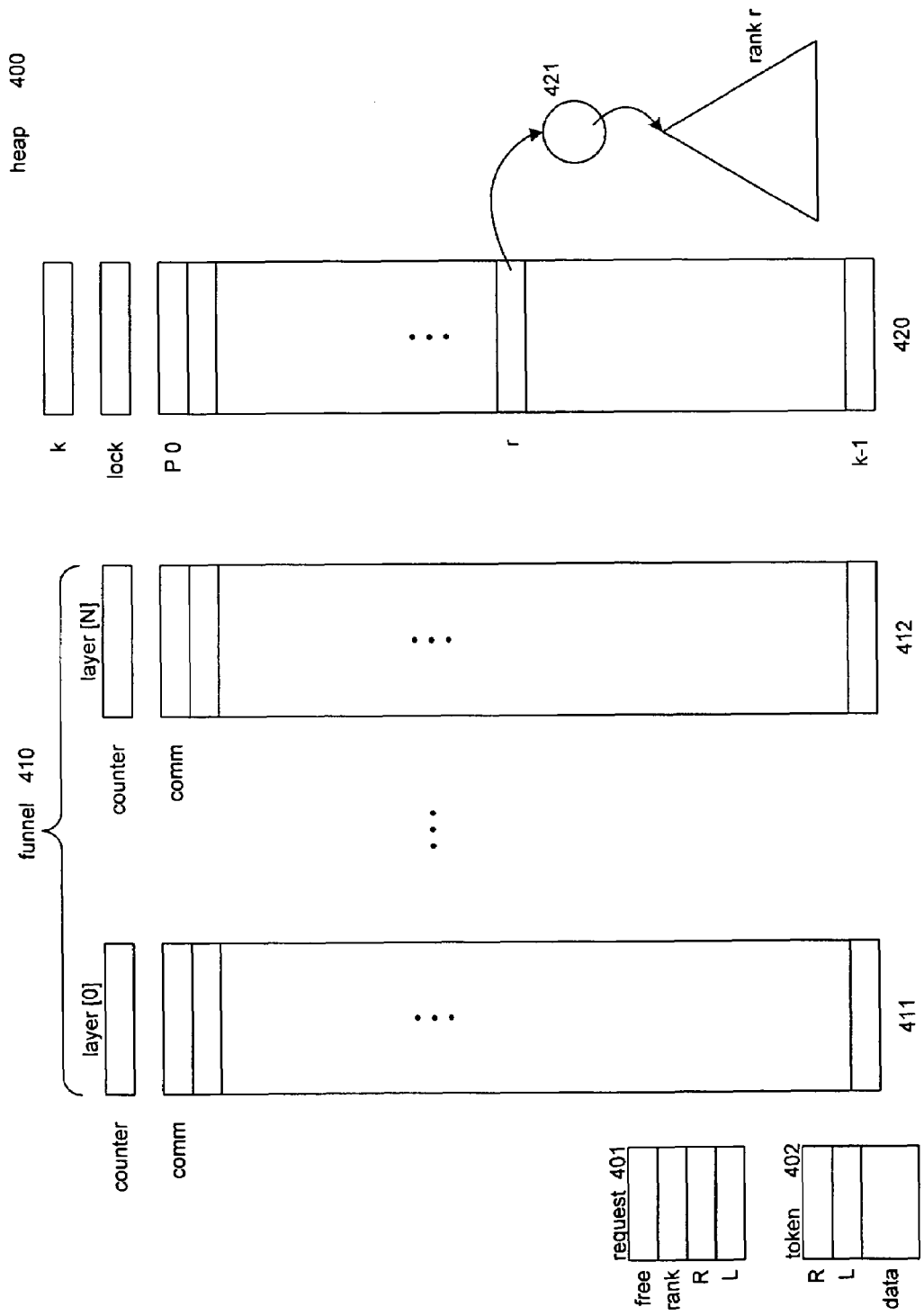
FIG. 4 is a block diagram that illustrates a heap data structure of the allocation system in one embodiment.

FIG. 4 is a block diagram that illustrates a heap data structure of the allocation system in one embodiment. The heap data structure 400 includes a heap funnel data structure 410 and a heap token data structure 420. The funnel data structure includes multiple layers 411 and 412. Each layer includes a counter and an layer array ("comm") for storing pointers to memory requests or combined memory requests. The counter of a layer is used to sequentially assign indexes within the array to threads that submit memory requests. The heap token data structure 420 includes a lock and a heap array of pointers. The lock is used to synchronize access to the heap array. Each entry of the heap array may point to a pennant data structure 421 that has a rank corresponding to the index of the heap array. A request data structure 401 includes free, rank, L, and R fields and may include a synchronized result field. The request data structures may be allocated on the stack of a thread. The token data structure 402 includes L and R fields. The allocation system may allocate tokens that have two extra words for L and R. In such a case, when a token is allocated to a thread, the size of the token can be stored in one of the fields so that when the token is de-allocated, the allocation system can determine the size of the token and thus the corresponding heap. Alternatively, the allocation system may not allocate any extra words for L and R. In such a case, the application would need to track the size of a token and indicate its size when the token is de-allocated.

Figure 5A:
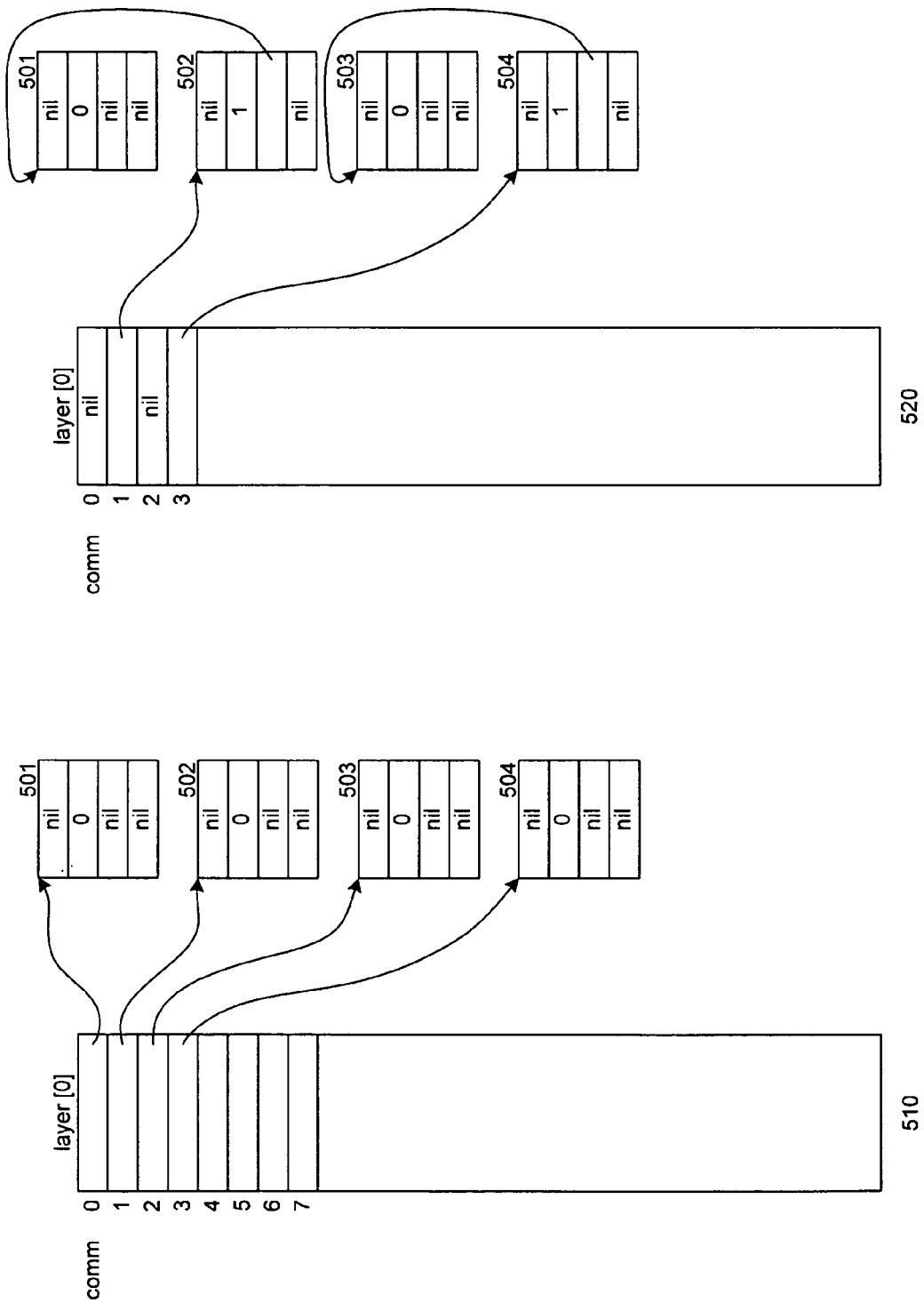
FIG. 5A is a block diagram that illustrates the combining of allocate memory requests of the allocation system in one embodiment.
Figure 5B:
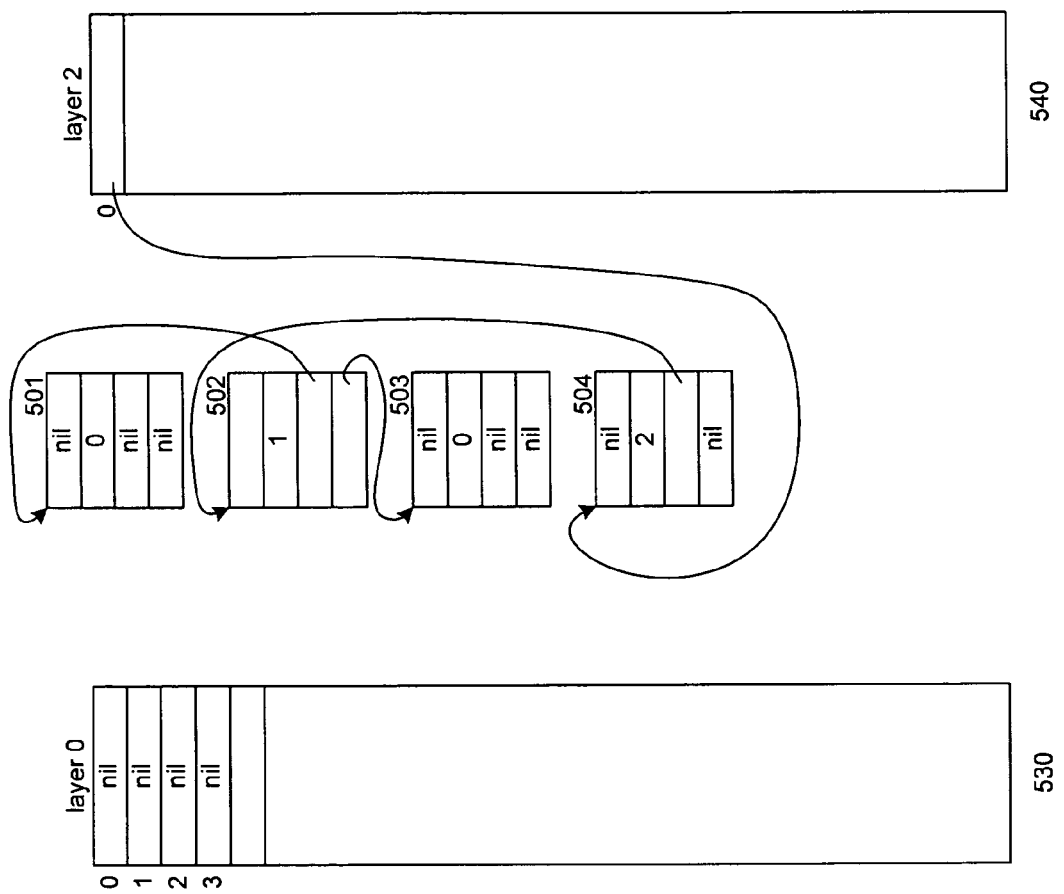
FIG. 5B is a block diagram that illustrates further combining of the memory requests of the allocation system in one embodiment.

FIG. 5A is a block diagram that illustrates the combining of allocate memory requests of the allocation system in one embodiment. In this example, four allocate memory requests have been received as defined by memory requests 501-504. Initially, each memory request has its free, L, and R fields set to nil and its rank field set to zero. Each thread that submitted a memory request updated the corresponding entry of the layer 0 510 of the funnel for the heap with the appropriate size tokens. The parent memory requests 502 and 504 combined with their child memory requests 501 and 503, respectively, as shown by layer 0 520. Thus, the entries 1 and 3 of the layer 0 array contain a pointer to a pennant of memory requests. FIG. 5B is a block diagram that illustrates further combining of the memory requests of the allocation system in one embodiment. In this example, the thread corresponding to entry 3 of layer 0 combined the memory requests 501-504 into a pennant of memory request with a rank of 2. The thread then attempted to access the heap to complete the memory requests of the pennant. However, the heap was locked by another thread. In such a case, the thread added an entry to the array for layer 2 540 to indicate that its pennant could be combined with another pennant of rank 2.

Figure 6:
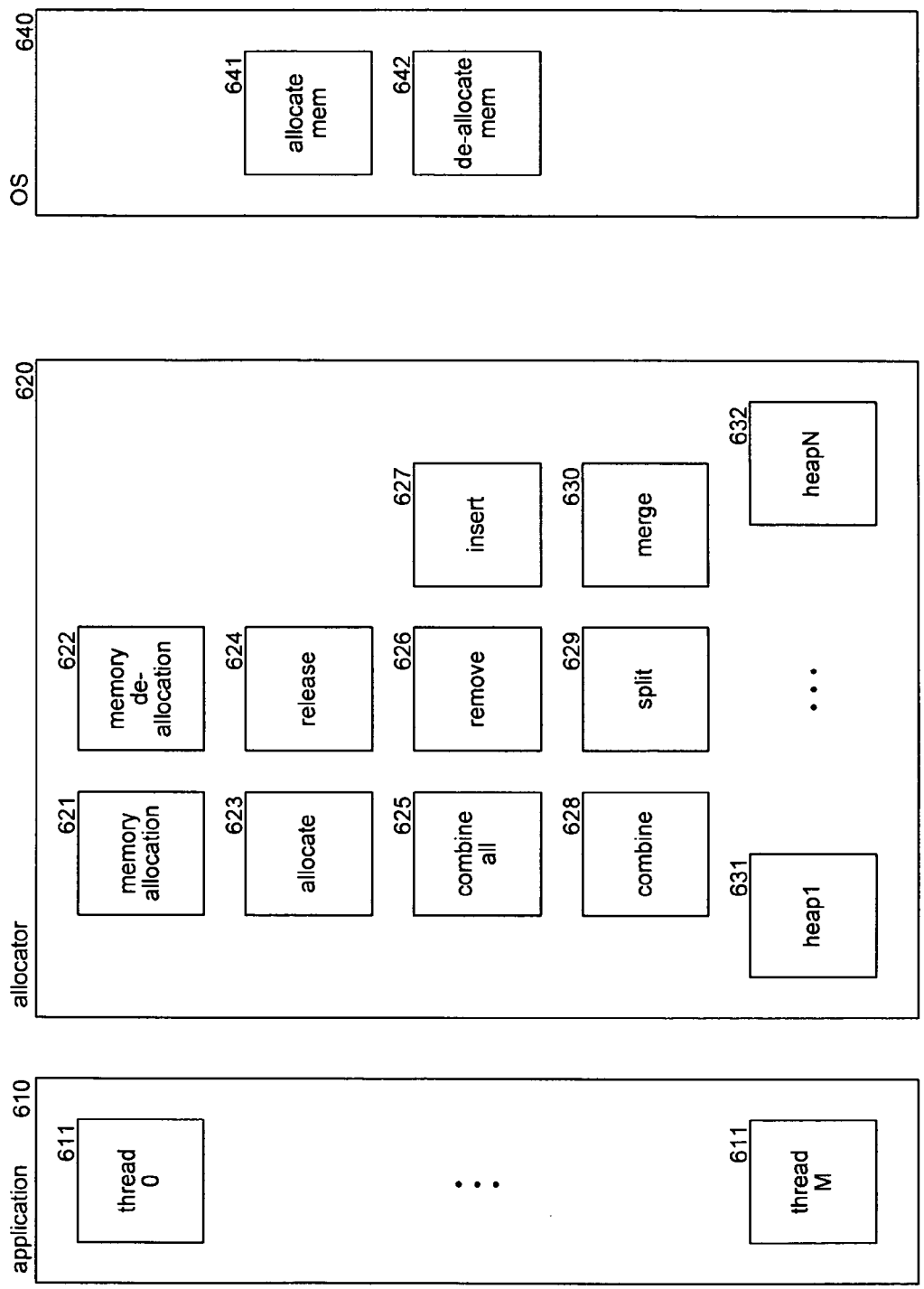
FIG. 6 is a block diagram that illustrates components of the allocation system in one embodiment.

FIG. 6 is a block diagram that illustrates components of the allocation system in one embodiment. The allocation system 620 is executed as part of the various threads 611 of an application 610. An application may have multiple threads that each invoke the memory allocation system under control of the thread to allocate and de-allocate tokens used by the thread. The allocation system invokes the operating system 640 to allocate blocks of memory and de-allocate blocks of memory using an allocate memory system call 641 and a de-allocate memory system call 642. Because the overhead of invoking a system call is high, the allocation system attempts to minimize the memory allocation system calls. In addition, because of the overhead of servicing each allocate and de-allocate memory request, the allocation system attempts to combine memory allocation requests when possible to minimize the number of accesses to the heap. The memory allocation system includes a memory allocation component 621, a memory de-allocation component 622, an allocate component 623, a release component 624, a combine all component 625, a remove component 626, an insert component 627, a combine component 628, a split component 629, and a merge component 630. These components interact with heaps 631-632 for various token sizes. Each of these components is described in detail below.

Figure 7:
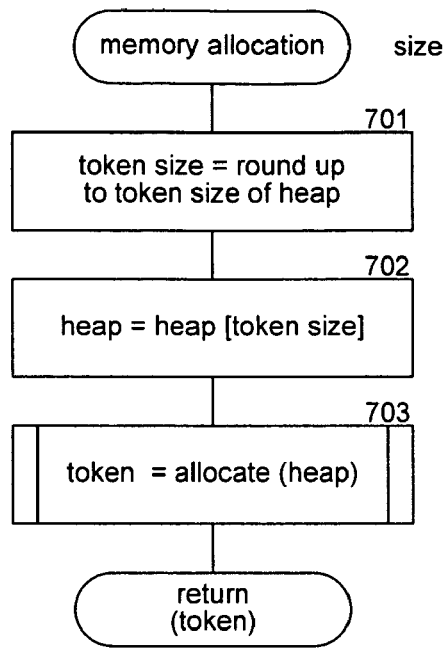
FIG. 7 is a flow diagram that illustrates the processing of the memory allocation component of the allocation system in one embodiment.

FIG. 7 is a flow diagram that illustrates the processing of the memory allocation component of the allocation system in one embodiment. The component corresponds to a "malloc" function that is called by an application to allocate a token. The component is passed the size of a token to be allocated and returns a reference to that token. In block 701, the component rounds up the size of the token to the next smallest token size of a heap that is larger than the requested size. For example, if the requested size is 7 and the smallest token size of a heap with a larger token size is 16, then the token size is set to 16. The component may also increase the requested size to account for any fields that are used for tracking free tokens. In block 702, the component identifies the heap with the appropriate token size. In block 703, the component invokes the allocate component passing the heap and receiving the allocated token in return. The component then returns the token to the invoking application.

Figure 8:
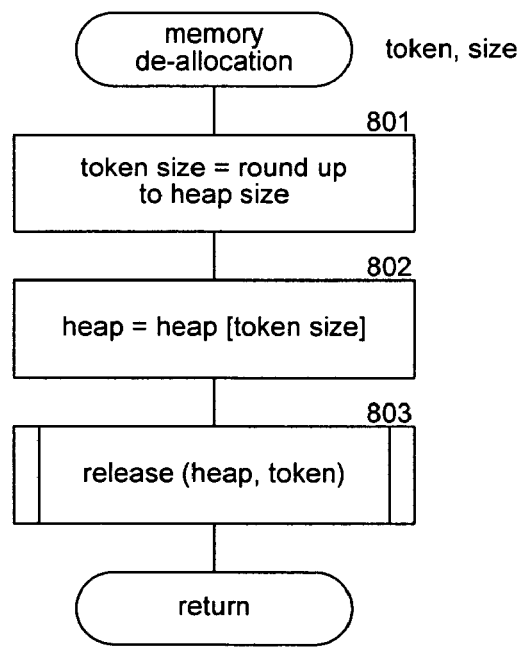
FIG. 8 is a flow diagram that illustrates the processing of the memory de-allocation component of the allocation system in one embodiment.

FIG. 8 is a flow diagram that illustrates the processing of the memory de-allocation component of the allocation system in one embodiment. The component corresponds to a "delete" function called by an application to release a token. The component is passed a token and its size and de-allocates the token. In block 801, the component rounds up the size of the token to the next smallest token size of the heap that is larger than the requested size. In block 802, the component identifies the heap with the appropriate token size. In block 803, the component invokes the release component passing the heap and the token. The component then returns.

Figure 9A:
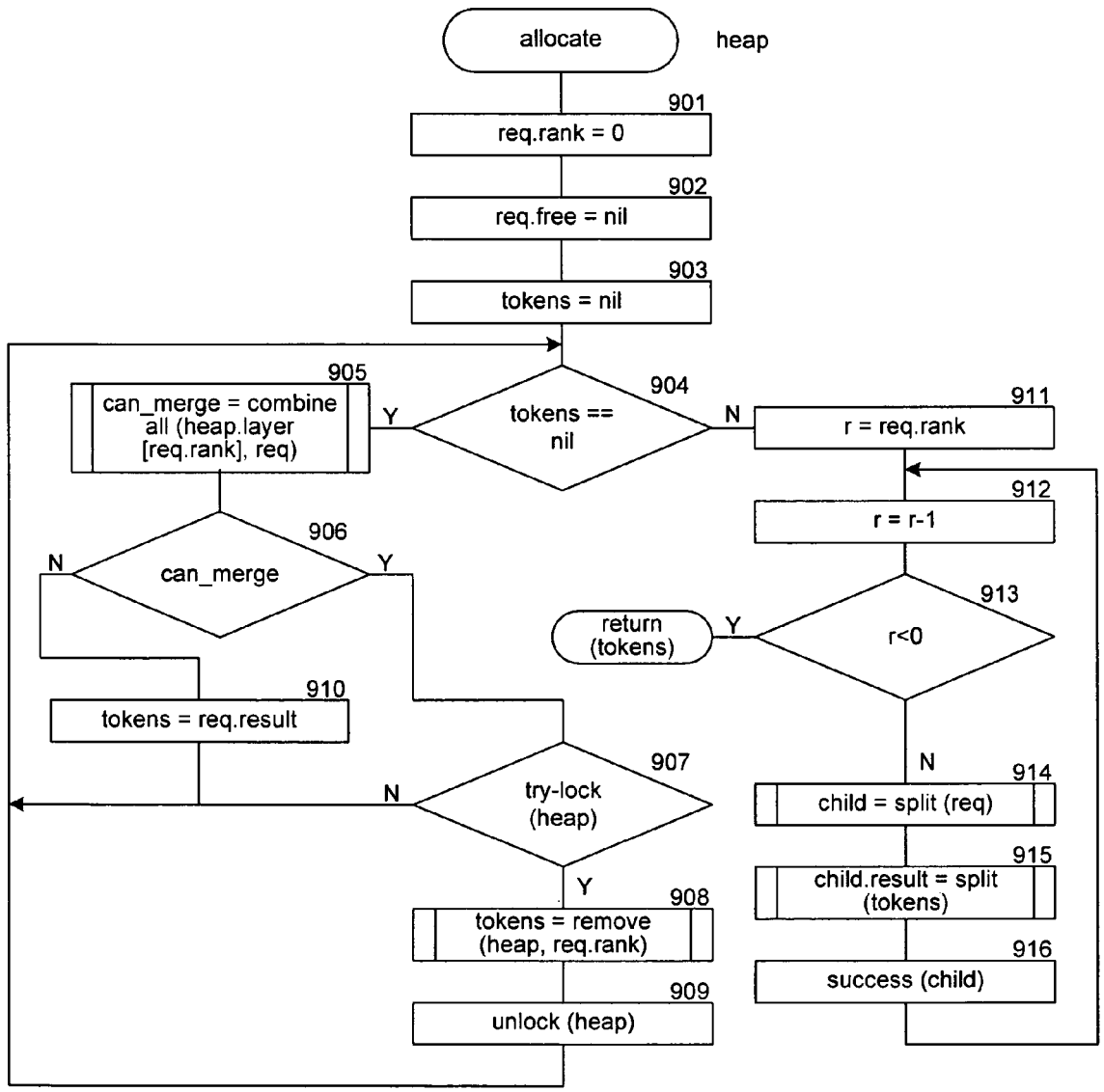
FIG. 9A is a flow diagram that illustrates the processing of the allocate component of the allocation system in one embodiment.

FIG. 9A is a flow diagram that illustrates the processing of the allocate component of the allocation system in one embodiment. The component is passed a heap and returns a token that has been allocated. The component loops trying to merge concurrent memory requests and attempting to update the heap to effect the allocation. The component then distributes the allocated tokens to satisfy child memory requests. In block 901, the component allocates a memory request data structure and sets its rank field to zero. In block 902, the component sets the free field to nil to indicate that this is an allocation request. In block 903, the component initializes the variable tokens to nil. In blocks 904-910, the component loops attempting to combine memory requests and removing tokens from the heap. In decision block 904, if the variable tokens are nil, then the component continues at block 905, else component continues at block 911. In block 905, the component invokes the combine all component passing an indication of the layer of the funnel for the heap along with the memory requests. The invoked component returns an indication of whether the memory request can be combined or merged with other memory requests. In decision block 906, if the memory request can be merged with other memory requests, then the component continues at block 907, else the component continues at block 910. In decision block 907, the component attempts to lock the heap. If the heap can be locked, then the component continues at block 908, else the component loops to block 904. In block 908, the component invokes the remove heap component passing the heap plus an indication of the rank of the pennant of tokens to be removed and receiving a pennant of allocated tokens in return. In block 909, the component unlocks the heap and then loops to block 904. In block 910, the component waits for the result of an allocation and then loops to block 904. In blocks 911-916, the component loops splitting the allocated tokens and providing pennants of allocated tokens for the child memory requests. In block 911, the component initializes a variable r to track decreasing rank. In block 912, the component decrements the rank. In decision block 913, if the rank is less than zero, then the component returns the single token pointed to by the variable tokens, else the component continues at block 914. In block 914, the component invokes the split component to split the aggregate memory request and identify a child memory request. In block 915, the component invokes the split component to split the pennant of tokens and allocate a pennant of tokens to the child memory request by setting the result field of the child memory request. In block 916, the component invokes the success function to notify the child that the memory allocation request has been completed-assuming the result was not a synchronized field. The component then loops to block 912 to decrement the rank.

Figure 9B:
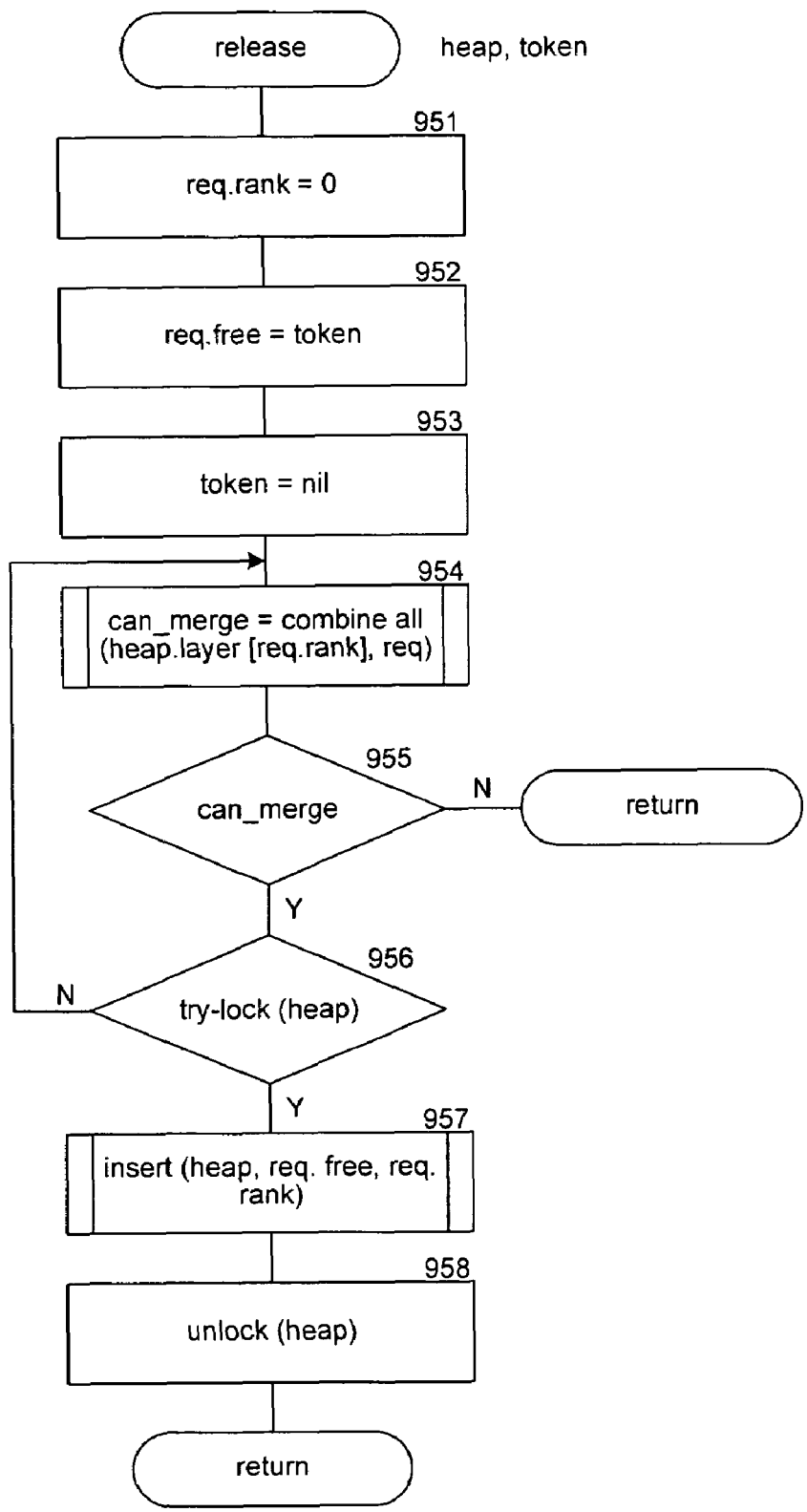
FIG. 9B is a flow diagram that illustrates the processing of the release component of the allocation system in one embodiment.

FIG. 9B is a flow diagram that illustrates the processing of the release component of the allocation system in one embodiment. The component is passed a heap and a pennant of tokens and attempts to merge de-allocate memory requests and insert free tokens into the heap. In block 951, the component allocates a memory request data structure and sets its rank field to zero. In block 952, the component sets the free field to point to the pennant of tokens to be de-allocated. In block 953, the component sets the variable token to nil. In blocks 954-956, the component loops attempting to combine memory requests and lock the heap. In block 954, the component invokes the combine all component to attempt to combine memory requests and receives an indication of whether further combining can occur. In decision block 955, if further combining can occur with a parent memory request, then the component continues at block 956, else the component returns. In decision block 956, the component attempts to lock the heap. If the attempt is successful, then the component continues at block 957, else the component loops to block 954. In block 957, the component invokes the insert component to insert the tokens into the heap. In block 958, the component unlocks the heap and then returns.

Figure 10:
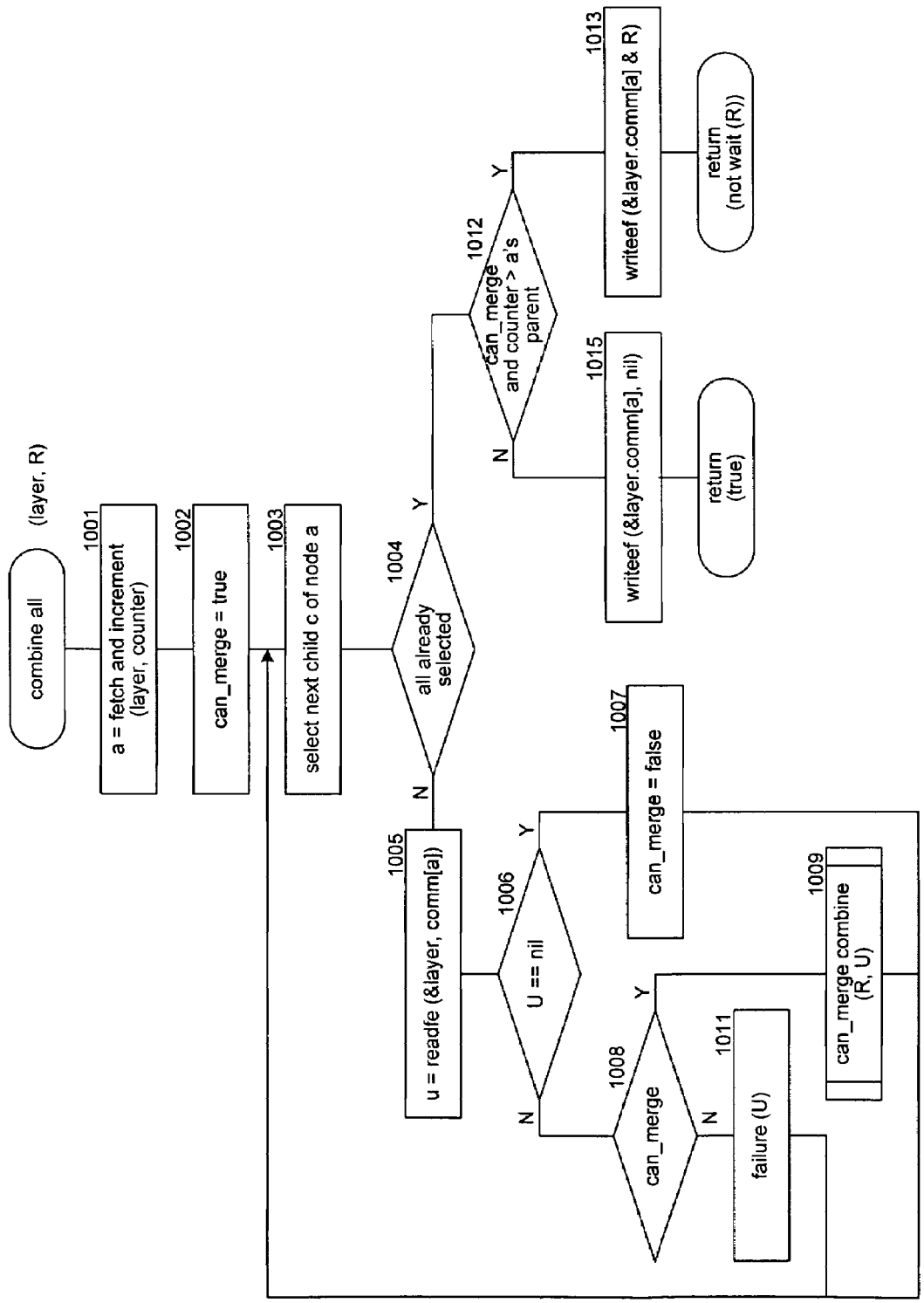
FIG. 10 is a flow diagram that illustrates the process of the combine all component of the allocation system in one embodiment.

FIG. 10 is a flow diagram that illustrates the process of the combine all component of the allocation system in one embodiment. The component is passed an indication of a layer of the heap and a memory request. The component attempts to combine that request with other requests of that layer. In block 1001, the component fetches and increments the counter for the layer. In block 1002, the component sets a can merge flag to true. The can merge flag indicates whether the passed memory request can continue to be merged with other memory requests. In blocks 1003-1011, the component loops determining whether the passed memory request can be merged with child memory requests. In block 1003, the component selects the next child memory request of the passed memory request in the decreasing order or numbering based on a binomial tree numbering scheme as described above. In decision block 1004, if all the child memory requests have already been selected, then the component continues at block 1012, else the component continues at block 1005. In block 1005, the component reads from the entry of the layer for the selected child memory request and leaves the entry empty. In decision block 1006, if the value of the retrieved entry is nil, then the passed memory request cannot be merged with the child memory request and the component continues at block 1007, else the component continues at block 1008. In block 1007, the component sets the can merge flag to false to indicate that the passed request cannot be merged. The component then loops to block 1003 to select the next child memory request. In decision block 1008, if the passed memory request can still merge with more child memory requests, then the component continues at block 1009, else the component continues at block 1011. In block 1009, the component invokes the combine component to combine the passed request with the child memory request and receives an indication of whether the combination was successful and sets the can merge flag accordingly. The component then loops to block 1003 to select the next child memory request. In block 1011, the component notifies the thread of the child memory request that the attempt to merge with its parent has failed so that the thread of the child memory request can continue processing. The component then loops to block 1003 to select the next child memory request. In decision block 1012, if the can merge flag indicates that the passed request can merge with its parent memory request and the parent memory request has been received, then the component continues at block 1013, else the component continues at block 1015. In block 1013, the component writes the address of the passed memory request to the entry of the layer for the passed memory request so that its parent memory request can access it. The component invokes the wait component to wait for a signal from the thread of the parent memory request and returns the negative of the value returned. In block 1015, the component writes nil to the entry of the layer for the passed memory request and then returns true.

Figure 11:
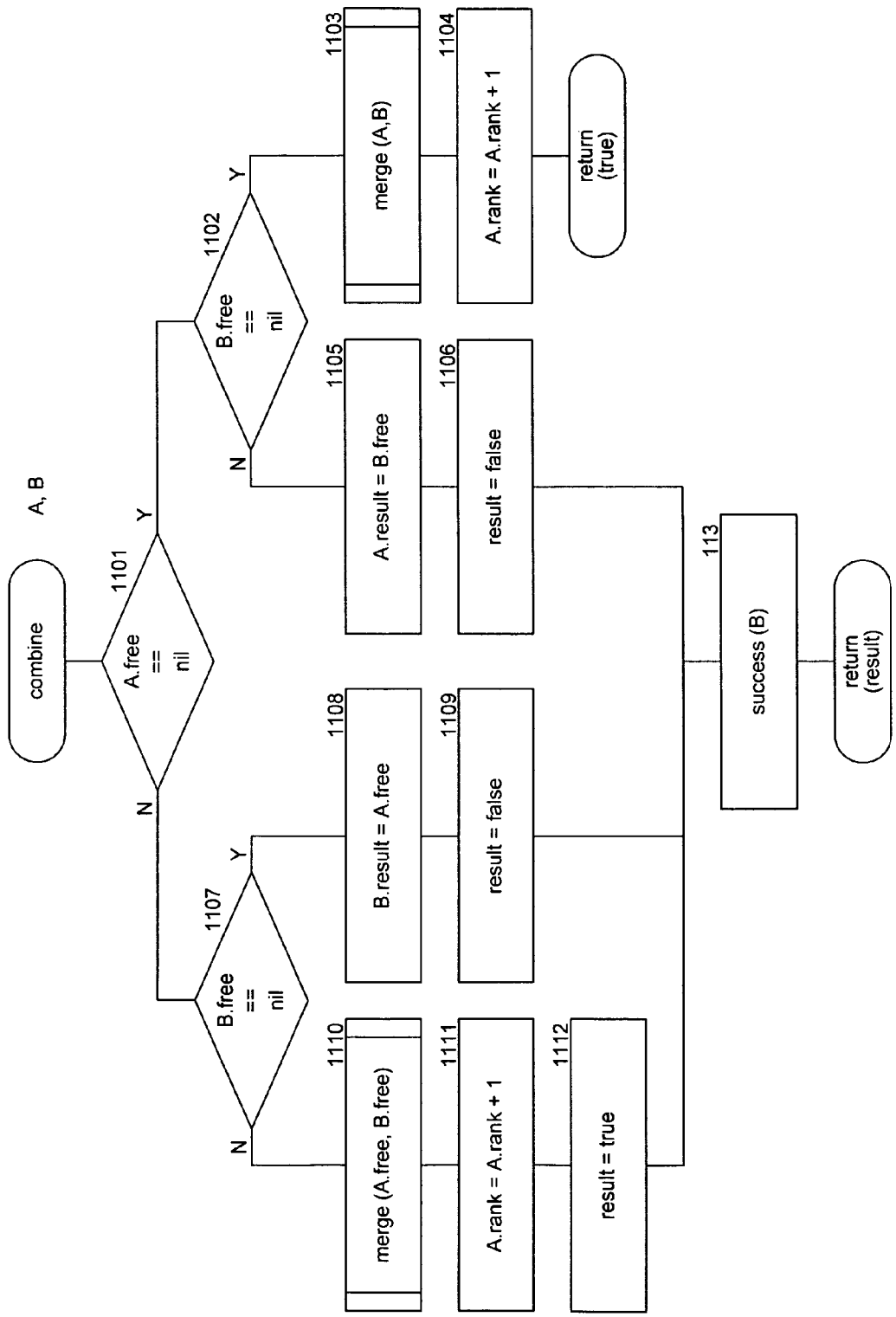
FIG. 11 is a flow diagram that illustrates the processing of the combine component of the allocation system in one embodiment.

FIG. 11 is a flow diagram that illustrates the processing of the combine component of the allocation system in one embodiment. The component is passed two memory requests and combines the memory requests by updating one of the memory requests, combining the pennants of tokens, or annihilating the memory requests. The component returns a value of false if the memory requests were annihilated. In decision block 1101, if the first memory request is to allocate, then the component continues at block 1102, else the component continues at block 1107. In decision block 1102, if the second memory request is to allocate, then the component continues at block 1103, else the component continues at block 1105. In block 1103, the component merges the two allocate memory requests by invoking the merge component, which updates the first memory request to aggregate the second memory request. In block 1104, the component increments the rank of the first memory request and returns a value of true to indicate that the combining was successful. In block 1105, the component annihilates the memory requests by setting the result field of the first memory request to the address of the pennant of tokens to be de-allocated as indicated by the second memory requests. In block 1106, the component sets a result flag to false and then continues at block 1113. In decision block 1107, if the second memory allocate request is to allocate, then the component continues at block 1108, else the component continues at block 1110. In block 1108, the component annihilates the memory requests by setting the result field of the second memory request to the address of the pennant of tokens to be de-allocated as indicated by the first memory request. In block 1109, the component sets the result flag to false and then continues at block 1113. In block 1110, the component invokes the merge component to merge the pennants of tokens that are to be de-allocated. The first memory request is updated as a result of this merge. In block 1111, the component increments the rank of the first memory request. In block 1112, the component sets of the result flag to true to indicate that the combining was successful. In block 1113, the component invokes the success function to indicate to the thread of the second memory request that the combining was successful and then returns the result flag.

Figure 12:
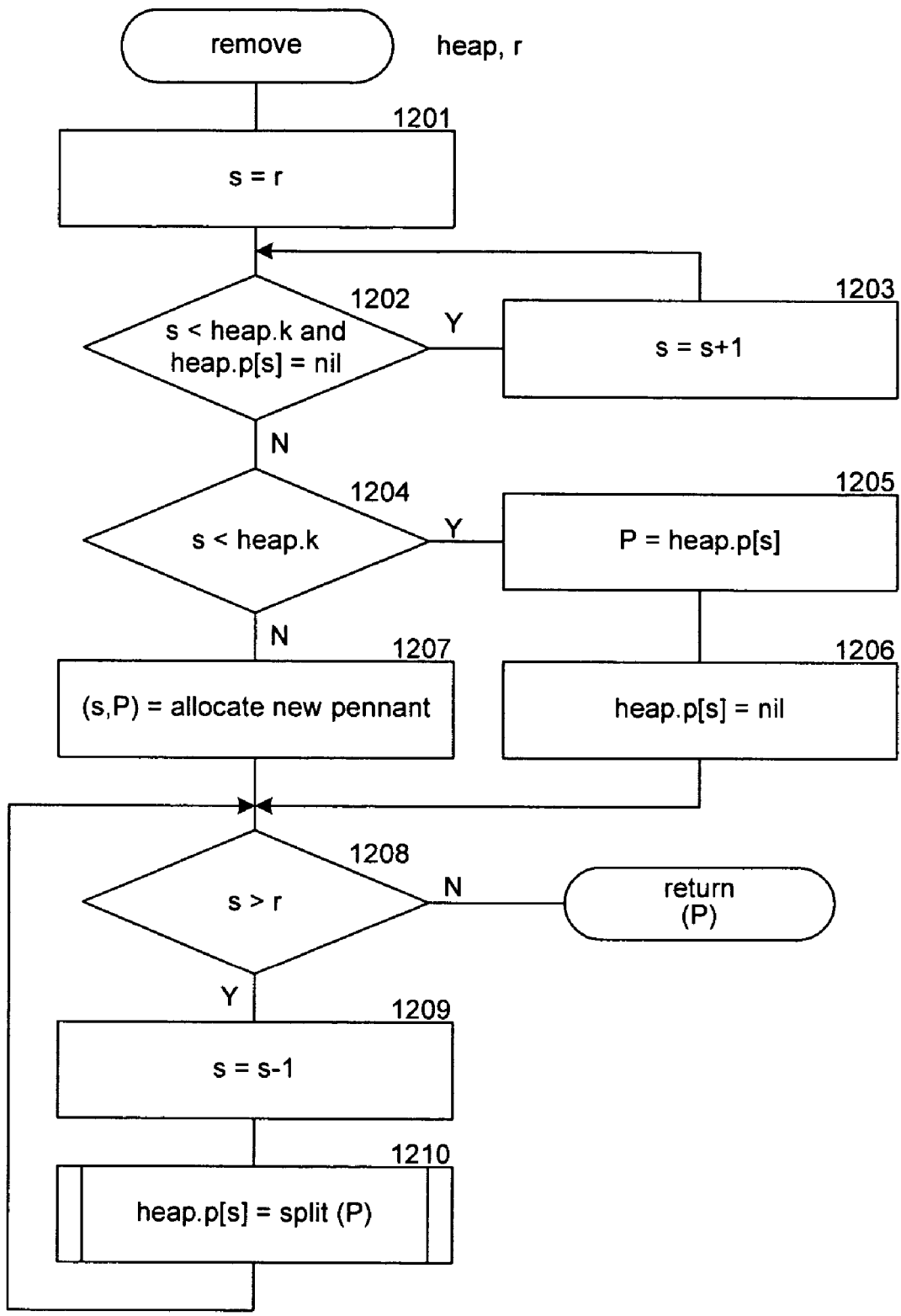
FIG. 12 is a flow diagram that illustrates the processing of the remove component of the allocation system in one embodiment.

FIG. 12 is a flow diagram that illustrates the processing of the remove component of the allocation system in one embodiment. The component is passed a heap along with a rank of a pennant that is to be removed from the heap. The component searches for a pennant with a rank that is as large as or larger than the passed rank. If the pennant's rank is larger than the passed rank, the component splits the pennant as appropriate. In block 1201, the component sets a search variable to the passed rank. In blocks 1202-1203, the component loops searching for a pennant that is large enough to satisfy the request. In decision block 1202, if the end of the heap has not been reached and the entry of the heap is nil, then the component continues at block 1203, else the component continues at block 1204. In block 1203, the component increments the variable to the next entry of the heap and then loops to block 1202. In decision block 1204, if the end of the heap was not reached, then the component continues at block 1205, else the component continues at block 1207. In block 1205, the component sets the pennant to the pennant pointed to by the selected heap entry. In block 1206, the component sets the selected heap entry to nil. In block 1207, the component invokes the memory allocation system call to allocate a new pennant. In blocks 1208-1210, the component loops splitting the pennant until a pennant of the passed rank is reached. In decision block 1208, if the selected entry is greater than the passed rank, then the component continues at 1209, else the component returns the current pennant. In block 1209, the component selects the next lower entry of the heap. In block 1210, the component invokes the split component to split the current pennant and set the entry of the selected heap to one of the split pennants. The component then loops to block 1208.

Figure 13:
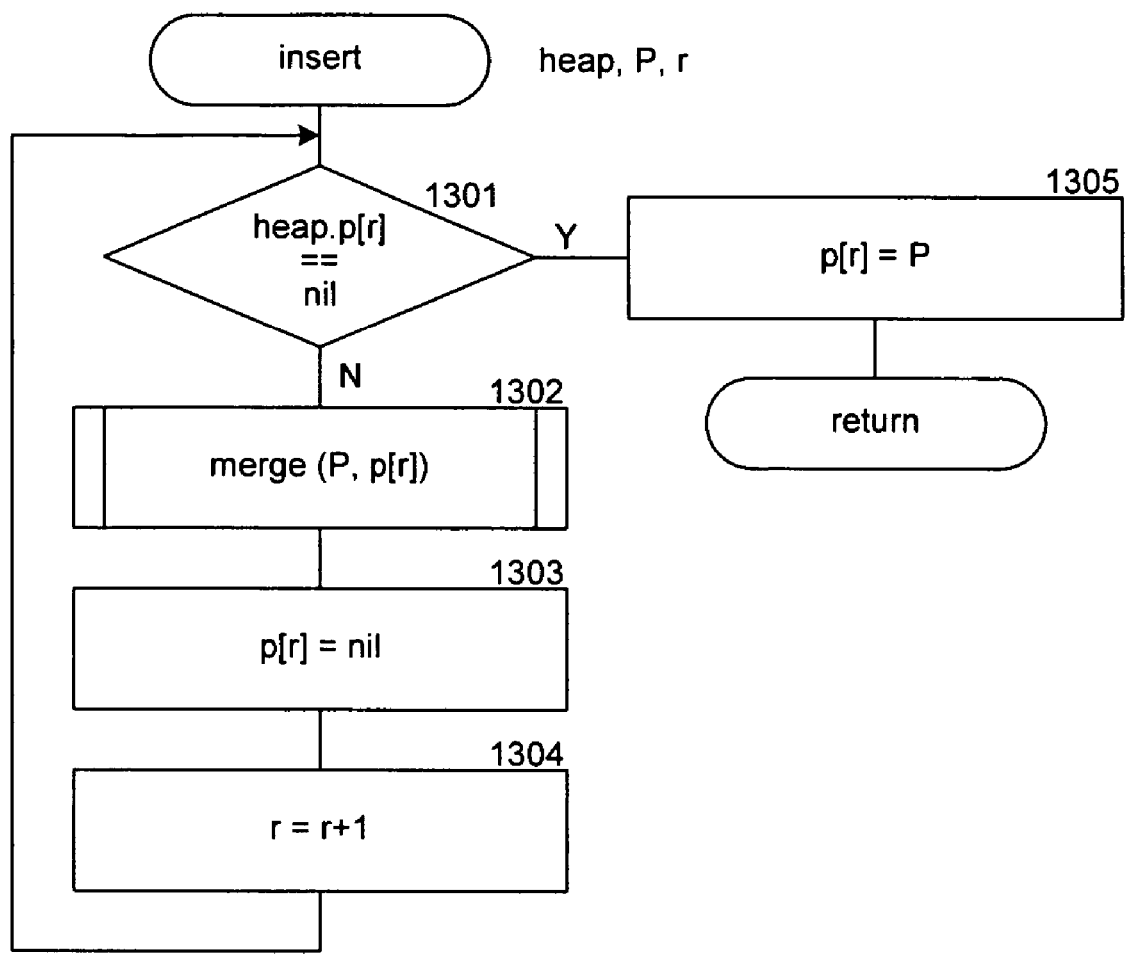
FIG. 13 is a flow diagram that illustrates the processing of the insert component of the allocation system in one embodiment.

FIG. 13 is a flow diagram that illustrates the processing of the insert component of the allocation system in one embodiment. The component is passed a heap, a pennant of tokens, and a rank. The component inserts that pennant into the heap, merging pennants as appropriate. In decision block 1301, if the entry for the current rank is nil, then the component continues at block 1305, else the component continues at block 1302. In block 1302, the component invokes the merge component to merge the pennant of the selected rank into the passed pennant. In block 1303, the component sets the entry for the current rank to nil. In block 1304, the component increments to the next rank and then loops to block 1301. In block 1305, the component sets the entry for the selected rank to point to the current pennant and then returns.

Figure 14:
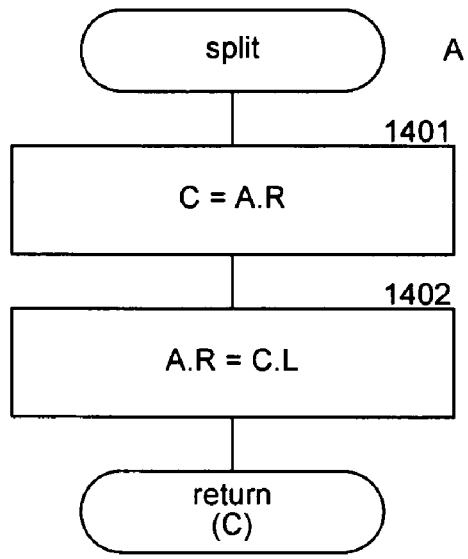
FIG. 14 is a flow diagram that illustrates the processing of the split component of the allocation system in one embodiment.

FIG. 14 is a flow diagram that illustrates the processing of the split component of the allocation system in one embodiment. The component is passed a pennant (i.e., of tokens or memory requests) and then splits the pennant. In block 1401, the component sets the address of the split-off pennant to point to the right pointer of the top node of the passed pennant. In block 1402, the component sets the right pointer of the top node of the passed pennant to point to the left pointer of the root node of the complete binary tree of the passed pennant and then returns the split-off pennant.

Figure 15:
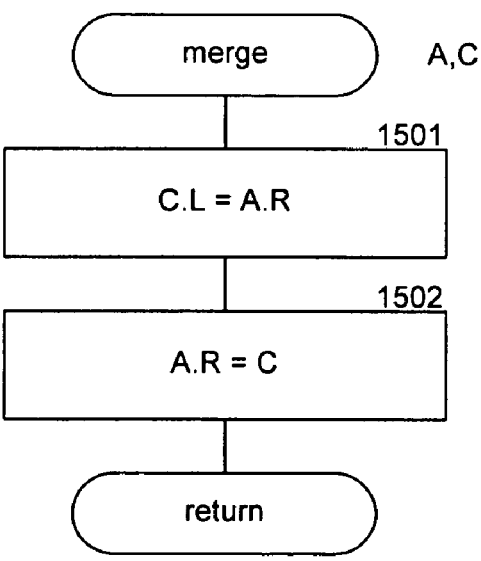
FIG. 15 is a flow diagram that illustrates the processing of the merge component of the allocation system in one embodiment.

FIG. 15 is a flow diagram that illustrates the processing of the merge component of the allocation system in one embodiment. The merge component is passed two pennants (i.e., for tokens or memory requests) and combines the pennants. In block 1501, the component sets the left pointer of the top node of the second pennant to the right pointer of the top node of the first pennant. In block 1502, the component sets the right pointer of the top node of the first pennant to point to the top node of the second pennant. The first pennant represents the combination. The component then returns.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computer system for allocating memory to threads of an application, the method comprising:
   providing a heap for tracking free tokens of memory, the tokens having a fixed token size, the heap for tracking collections of free tokens of different collection sizes;
   receiving memory requests from threads of the application, each memory request having a type of allocate or de-allocate; and
   when memory requests are pending concurrently from multiple threads, combining memory requests of the same type; and
      under control of one of the threads, updating the heap based on the combined memory request
so that the heap need be only updated once for a combination of memory requests.

2. The method of claim 1 wherein the updating of the heap includes:
   determining whether the heap is currently being accessed by another thread; and
   when it is determined that the heap is currently being accessed by another thread, continuing to combine memory requests of the same type until the heap can be updated.

3. The method of claim 2 wherein a funnel data structure is used to track memory requests that can continue to be combined.

4. The method of claim 2 wherein combinations of memory requests are tracked using a pennant data structure.

5. The method of claim 1 wherein the heap uses a pennant data structure to track collections of tokens.

6. The method of claim 1 including providing multiple heaps for different fixed token sizes.

7. The method of claim 6 wherein when a memory request is received, identifying a heap with the smallest token size that is greater than or equal to the size of the request.

8. The method of claim 1 wherein when an allocate memory request is pending concurrently with a de-allocate memory request, satisfying the allocate memory request with the token of the de-allocate memory request.

9. The method of claim 1 wherein when the heap does not contain a collection of tokens of sufficient size to satisfy an allocate memory request, requesting an operating system to allocate a block of memory of sufficient size.

10. The method of claim 1 wherein allocate memory requests are combined by combining the pennants of memory requests.

11. The method of claim 1 wherein de-allocate memory requests are combined by combining pennants of tokens to be de-allocated.

12. A computer for allocating memory to threads of an application, comprising:
   a processor;
   a memory; and
   a memory allocator comprising:
      a plurality of heaps for tracking free tokens of memory, each heap for handling tokens of a fixed token size and tracking collections of different collection sizes of free tokens of the fixed token size;
      a combine all component that combines memory requests with memory requests that have not yet been completed, each memory request being from a different thread of an application; and
      a combine component that combines memory requests of the same type and annihilates memory requests of different types.

13. The computer of claim 12 including:
   an allocate component that invokes the combine all component to further combine memory requests when the heap of the token size cannot be accessed; and
   a de-allocate component that invokes the combine all component to further combine memory requests when the heap of the token size cannot be accessed.

14. The computer of claim 13 wherein the allocate component invokes an operating system to allocate a block of memory when a heap does not have sufficient free tokens to satisfy an allocate memory request.

15. The computer of claim 13 wherein a funnel data structure is used to track memory requests that can continue to be combined.

16. The computer of claim 12 wherein combinations of memory requests are tracked using a pennant data structure.

17. The computer of claim 12 wherein a heap uses a pennant data structure to track collections of tokens.

18. The computer of claim 12 including a component that, when a memory request is received, identifies a heap with the smallest token size that is greater than or equal to the size of the request.

19. The computer of claim 12 wherein allocate memory requests are combined by combining the pennants of memory requests.

20. The computer of claim 12 wherein de-allocate memory requests are combined by combining pennants of tokens to be de-allocated.

21. The computer of claim 12 wherein when an allocate memory request is pending concurrently with a de-allocate memory request, satisfying the allocate memory request with the token of the de-allocate memory request.

22. A computer-readable medium encoded with computer-executable instructions for controlling a computer system for managing memory to threads of an application, by a method comprising:
   providing a plurality of heap data structures for tracking free tokens of memory, each heap for handling tokens of a fixed token size and tracking collections of different collection sizes of free tokens of the fixed token size, each heap having a funnel data structure for tracking memory requests that may be combined;
   receiving memory requests from threads of the application, each memory request having a type of allocate or de-allocate and a token size; and when memory requests of the same token size are pending concurrently from multiple threads,
combining memory requests of the same type; and
under control of one of the threads,
attempting to access the heap for tokens of the token size;
when the attempt is successful, updating the heap based on the combined memory request; and
when the attempt is unsuccessful, continuing to combine memory requests tracked by the funnel data structure until the heap can be accessed
so that a heap need be only updated once for a combination of memory requests.

* * * * *